US010436939B2

(12) United States Patent
Ward et al.

(10) Patent No.: US 10,436,939 B2
(45) Date of Patent: Oct. 8, 2019

(54) LOFTING ALGORITHM FOR DISCRETE NETWORK MESHING

(71) Applicant: Landmark Graphics Corporation, Houston, TX (US)

(72) Inventors: Steven Bryan Ward, Austin, TX (US); Michael Loyd Brewer, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 488 days.

(21) Appl. No.: 14/888,405

(22) PCT Filed: Jul. 2, 2013

(86) PCT No.: PCT/US2013/049149
§ 371 (c)(1),
(2) Date: Oct. 30, 2015

(87) PCT Pub. No.: WO2015/002643
PCT Pub. Date: Jan. 8, 2015

(65) Prior Publication Data
US 2016/0170086 A1 Jun. 16, 2016

(51) Int. Cl.
*G06F 7/60* (2006.01)
*G06F 17/10* (2006.01)
(Continued)

(52) U.S. Cl.
CPC ............ *G01V 99/005* (2013.01); *G06T 17/05* (2013.01); *G06T 17/20* (2013.01); *G01V 2210/624* (2013.01); *G01V 2210/646* (2013.01)

(58) Field of Classification Search
CPC ........... G01V 99/005; G01V 2210/646; G01V 2210/66; G01V 2210/64; G01V 2210/624; G06T 17/20; G06T 17/05
(Continued)

(56) References Cited

U.S. PATENT DOCUMENTS

| 6,078,869 A | 6/2000 | Gunasekera | |
|---|---|---|---|
| 2006/0025976 A1* | 2/2006 | Kennon | ............ G06F 17/5018 703/10 |

(Continued)

OTHER PUBLICATIONS

International Search Report, dated Mar. 18, 2014, 10 pages; Korean International Searching Authority.
(Continued)

*Primary Examiner* — Mohammed Shamsuzzaman
*Assistant Examiner* — Aaron J Gray

(57) ABSTRACT

The disclosed embodiments include a method, apparatus, and computer program product for generating hybrid computational meshes around complex and discrete fractures for the purpose of reservoir simulation. For example, one disclosed embodiment includes a method that comprises receiving a set of 3D fracture surfaces with geometry that has been discretized in a 2D manifold by a collection of polygons. The method defines a family of non-intersecting 2D slicing surfaces for slicing the set of 3D fracture surfaces. The method then uses the intersection of the 2D slicing surface with the 2D manifolds defining the fracture surfaces to create a set of 2D fractures on each slicing surface. Following a series of steps, the method generates three-dimensional shells connecting a set of stadia corresponding to each fracture on each 2D slicing surface to a corresponding set of stadia on a neighboring 2D slicing surface for creating a three-dimensional model.

20 Claims, 10 Drawing Sheets

(51) Int. Cl.
  *G06G 7/50* (2006.01)
  *G06T 15/30* (2011.01)
  *G06T 17/20* (2006.01)
  *G01V 99/00* (2009.01)
  *G06T 17/05* (2011.01)
(58) Field of Classification Search
  USPC .................................... 703/10, 2; 345/423
  See application file for complete search history.

(56) References Cited

U.S. PATENT DOCUMENTS

| | | | |
|---|---|---|---|
| 2007/0027666 A1 | 2/2007 | Frankel | |
| 2008/0091396 A1* | 4/2008 | Kennon | E21B 43/26 703/10 |
| 2011/0015909 A1 | 1/2011 | Zhao | |
| 2012/0267104 A1 | 10/2012 | Clarkson et al. | |
| 2013/0073272 A1* | 3/2013 | Wallace | E21B 43/00 703/10 |
| 2013/0124169 A1 | 5/2013 | Sung | |

OTHER PUBLICATIONS

European Patent Office, Supplementary European Search Report, dated Feb. 16, 2017, 8 pages, Europe.
Huilin Xing, Wenhui Yu and Ji Zhang, 3D Mesh Generation in Geocomputing, Jan. 1, 2009, 39 pages, vol. 119, Lecture notes in Earth Sciences.

* cited by examiner

LOFTING ALGORITHM FOR DISCRETE NETWORK MESHING

CROSS-REFERENCE TO RELATED APPLICATIONS

This application is a U.S. national stage patent application of International Patent Application No. PCT/US2013/049149, filed on Jul. 2, 2013, the benefit of which is claimed and the disclosure of which is incorporated herein by reference in its entirety.

BACKGROUND OF THE INVENTION

1. Field of the Invention

The present invention generally relates to a system and method for generating a grid that can be used to construct a simulation model of a subsurface reservoir, and more particularly, to a system and method configured for modeling geological fractures.

2. Discussion of the Related Art

In the oil and gas industry, reservoir modeling involves the construction of a computer model of a petroleum reservoir for the purposes of improving estimation of reserves and making decisions regarding the development of the field. For example, geological models may be created to provide a static description of the reservoir prior to production. In contrast, reservoir simulation models may be created to simulate the flow of fluids within the reservoir over its production lifetime.

One challenge with reservoir simulation models is the modeling of fractures within a reservoir, which requires a thorough understanding of matrix flow characteristics, fracture network connectivity and fracture-matrix interaction. Fractures can be described as open cracks or voids within the formation and can either be naturally occurring or artificially generated from a wellbore. The correct modeling of the fractures is important as the properties of fractures such as spatial distribution, aperture, length, height, conductivity, and connectivity significantly affect the flow of reservoir fluids to the well bore.

Accordingly, the disclosed embodiments provide a system, method, and computer program product for generating hybrid computational meshes around complex and discrete fractures for the purpose of reservoir simulation.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for modeling three-dimensional (3D) objects, such as, but not limited to, geological fractures. The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
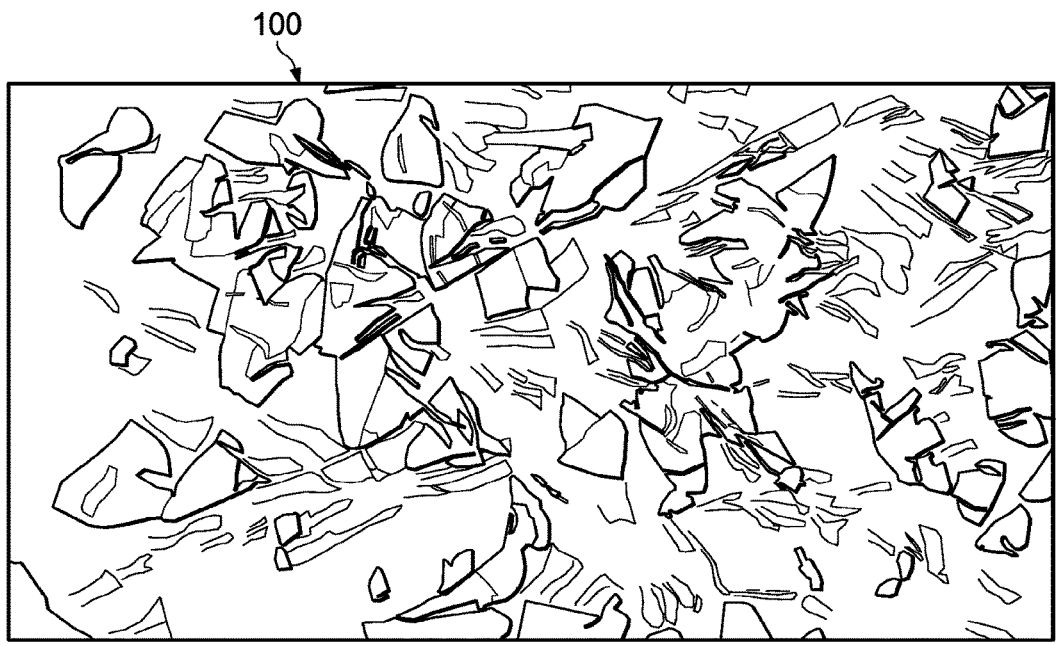
FIG. 1 illustrates an image of three-dimensional fractures that are modeled in accordance with the disclosed embodiments.

FIG. 1 illustrates an image of three-dimensional fractures that are modeled in accordance with the disclosed embodiments. As can be seen in image 100, the layers of earth formation include fractures within the formation. As stated above, these fractures can be described as open cracks or voids within the formation and can either be naturally occurring or artificially generated from a wellbore. Understanding and modeling the proper characteristic of these fractures is important as the fractures enable and affect the flow of reservoir fluids to the well bore. Images such as image 100 may be obtained or generated using image logs. Image logs use a rotating transducer to measure acoustic impedance across the entire borehole wall to identify the presence and direction of rock fractures, as well as understanding the dip direction of the stratigraphy.

Figure 2A:
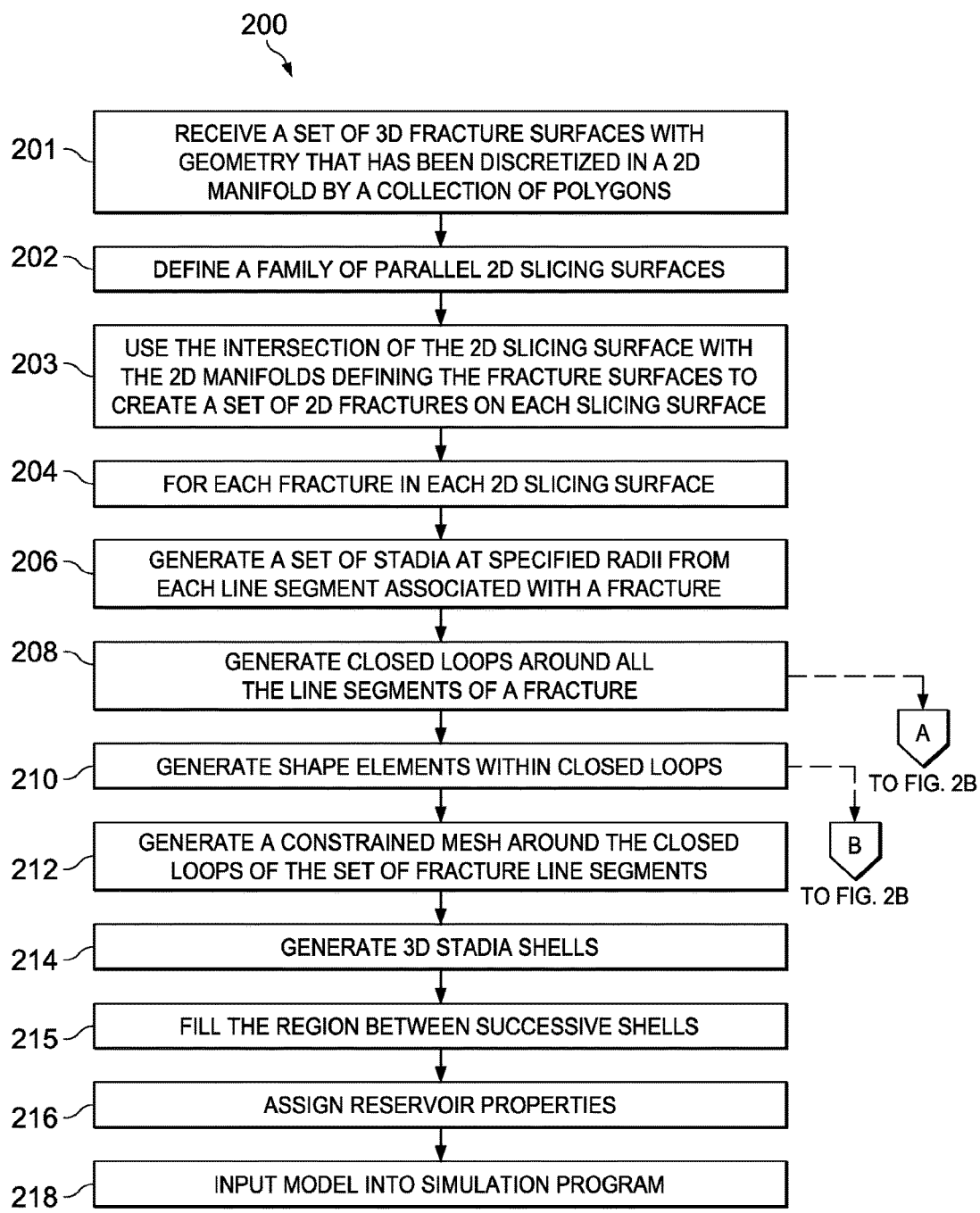
FIG. 2 is a flow diagram illustrating a method for modeling three-dimensional fractures in accordance with a disclosed embodiment.
Figure 2B:
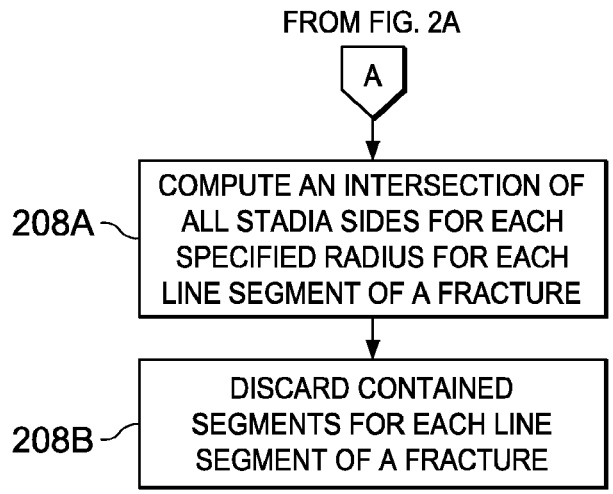
Figure 2B:
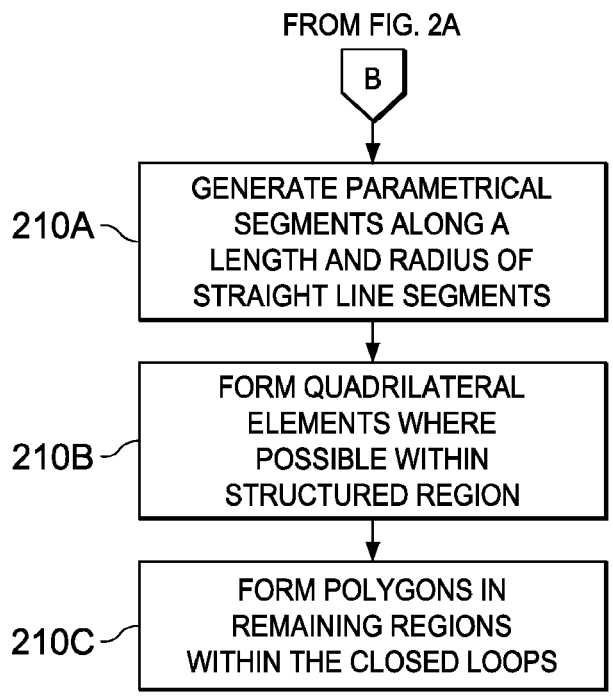

FIG. 2 is a flow diagram illustrating a method/process 200 for modeling three-dimensional fractures in accordance with a disclosed embodiment. In the depicted embodiment, the method begins by receiving a set of 3D fracture surfaces with geometry that has been discretized in a 2D manifold by a collection of polygons (step 201). In an alternative embodiment, the process 200 may begin by performing the discretization of a set of 3D fractures to generate the collection of 2D manifolds/fracture surfaces.

The method defines or includes a defined set/family of non-intersecting 2D slicing surfaces that is used to slice the set of 2D fracture surfaces (step 202). In certain embodiments, the number of slicing surfaces in a family that is used for slicing the set of 2D manifolds may be user-modifiable. Additionally, in some embodiments, the dimensions of the slicing surfaces may be user-modifiable.

Figure 3:
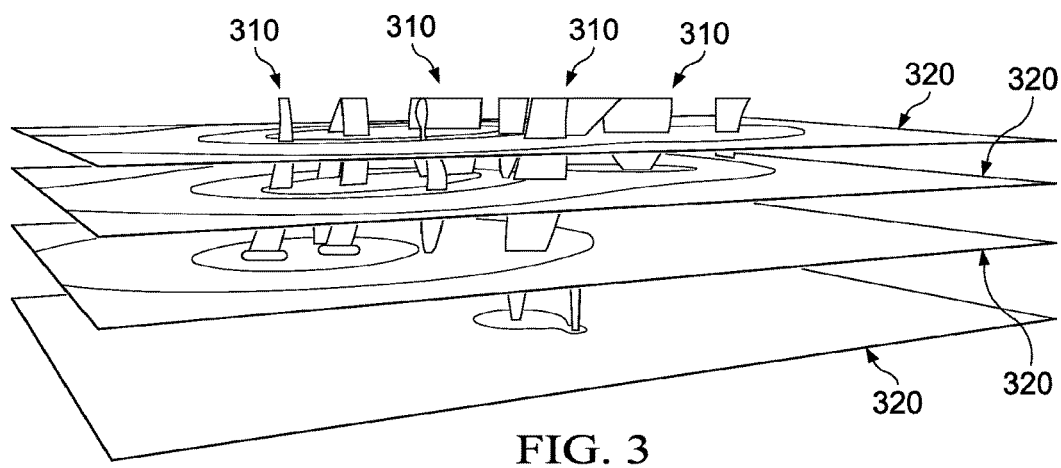
FIG. 3 illustrates an example a set of non-intersecting 2D slicing surfaces intersecting a set of discretized two-dimensional fractures/manifolds in accordance with the disclosed embodiments.
Figure 3A:
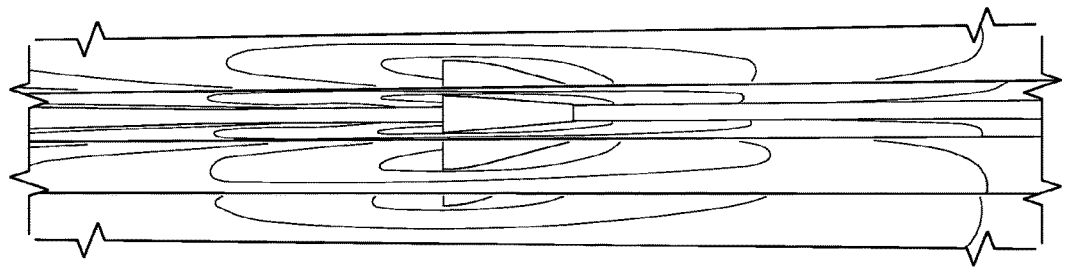
FIG. 3A illustrates an example a set of non-intersecting 2D slicing surfaces intersecting a single perpendicular 2D fracture/manifold in accordance with the disclosed embodiments.
Figure 3B:
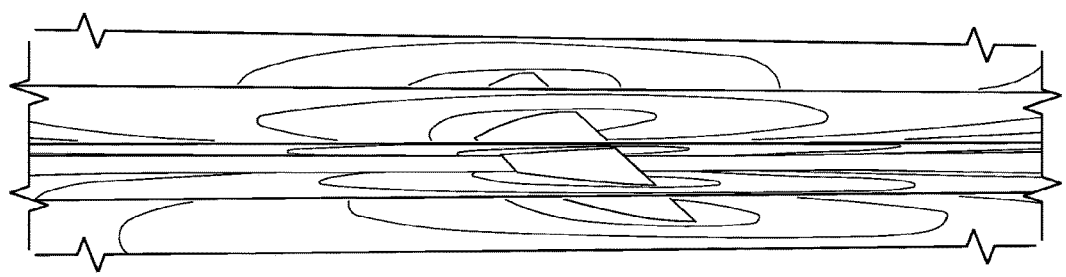
FIG. 3B illustrates an example a set of non-intersecting 2D slicing surfaces intersecting a single angled 2D fracture/manifold in accordance with the disclosed embodiments.

The method uses the intersection of the 2D slicing surfaces with the 2D manifolds defining the fracture surfaces to create a set of 2D fractures lines on each slicing surface (step 203). As an illustrative examples, FIG. 3 depicts a diagram illustrating an example of a set of non-intersecting 2D slicing surfaces 320 that are used to slice a set of 2D fractures/manifolds 310, FIG. 3A provides a more detailed view that illustrates an example a set of non-intersecting 2D slicing surfaces intersecting a single perpendicular 2D manifold in accordance with the disclosed embodiments, and FIG. 3B illustrates an example a set of non-intersecting 2D slicing surfaces intersecting an angled 2D manifold in accordance with the disclosed embodiments.

As stated above, a set of 2D fractures is created on each slicing surface at the intersection of the slicing surface and the set of 2D manifolds. Each 2D fracture consists of one or more fracture line segments. In accordance with the disclosed embodiment, for each fracture in a slicing surface (step 204), the method generates a set of stadia at a specified radii around each fracture line segment associated with the fracture (step 206). The method then generates, for each fracture, closed loops around all of the line segments associated with a fracture (step 208). In certain embodiments, the process of generating the closed loop around line segments associated with a fracture may include computing an intersection of all stadia sides for each specified radius for each line segment of the fracture (step 208A) and discarding the contained segments for each line segment associated with the fracture that are wholly contained by stadia of other line segments associated with the fracture (step 208B).

Following step 208, the method generates shape elements within the closed loops associated with a fracture (step 210). For example, in one embodiment, the process generates parametrical segments along a length and radius of each straight line segment (step 210A). The process then forms quadrilateral elements where possible within the structured region (step 210B) and form polygons within the remaining regions of the closed loops (step 210C).

Once the shape elements are generated, the process generates a constrained mesh around the closed loops of the set of fractures to fill the remainder of the two-dimensional surface (step 212). In one embodiment, a Delaunay triangulation algorithm is utilized to generate the constrained mesh around the closed loops of the set of fracture line segments. Thus, each of the two-dimensional surfaces now consists entirely of two-dimensional cell elements that are contained in the set of fractures or the constrained mesh.

At step 214, the process generates three-dimensional shells by connecting the set of stadia corresponding to each fracture from each slicing surface to its above/below neighbors using a lofting algorithm. Lofting, also called skinning and surface reconstruction, is a modeling technique that fits a surface through a series of curves and builds the required topology for the resulting body/volumetric region. The lofting algorithm includes instructions for determining which stadium on a neighboring slicing surface corresponds to a stadium on a first slicing surface. Once determined, the lofting algorithm connects a perimeter of the stadium on the first slicing surface and a perimeter of the corresponding stadium on a neighboring slicing surface using a one-to-one point correspondence. This step is performed on each stadium in the set of stadia corresponding to each fracture to create a set of three-dimensional successive shells corresponding to the set of stadia. For instance, in its simplest form, the process would create a set of cylindrical three-dimensional shells for a set of stadia enclosing a single straight fracture. The angle of a set of three-dimensional shells corresponds to an angle of the 2D fracture surfaces that are being intersected by the 2D slicing surfaces.

Figure 9:
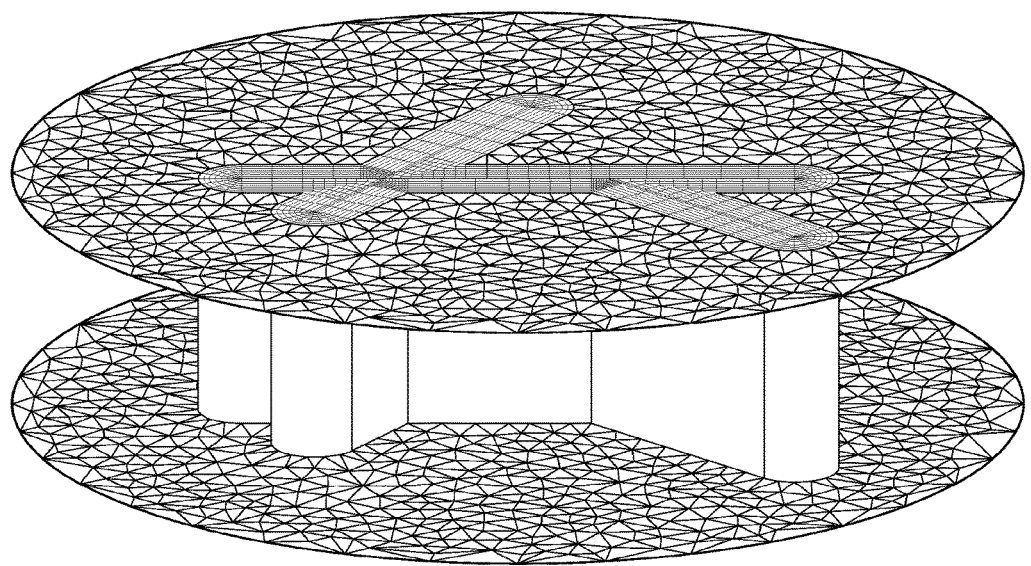
FIG. 9 illustrates an example of a diagram depicting a perspective view of a 3D shell connecting a set of stadia associated with a group of intersecting fracture lines to a second set of stadia associated with the group of intersecting fracture lines that are located on a neighboring slicing surface in accordance with the disclosed embodiments.

The lofting algorithm also includes instructions for handling intersecting fractures and creating three-dimensional shells using the stadia enclosing the intersecting fractures. For instance, the lofting algorithm may generate a T, X, or other various shaped three-dimensional shell connecting the stadia of two or more intersecting fractures on corresponding slicing surface. For example, FIG. 9 illustrates an example of a diagram depicting a perspective view of a 3D shell connecting a set of stadia associated with a group of intersecting fracture lines to a second set of stadia associated with the group of intersecting fracture lines that are located on a neighboring slicing surface in accordance with the disclosed embodiments. In the illustrated example, the 3D shell is shaped similar to that of a stick figure based on the configuration of the group of intersecting fracture lines. As stated above, although only the outermost 3D shell can be seen, the lofting algorithm creates many successive 3D inner shells as well. The number of 3D shells created is based on the number of stadia enclosing the fracture line segments.

Figure 9A:
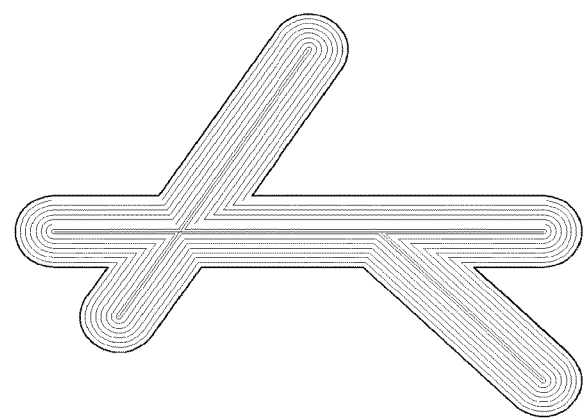
FIG. 9A illustrates a top view of successive 3D shells for the set of stadia of FIG. 9.

FIG. 9A illustrates a top view showing the successive 3D shells for the set of stadia indicated in FIG. 9. The top view illustrated in FIG. 9A may vary depending on the angle of the group of intersecting fracture lines between neighboring slicing surfaces. In the depicted example, the fracture is assumed to be normal to both the neighboring slicing surfaces.

Following generation of the stadia 3D shells, the process generates cells, such as, but not limited to, polyhedra cells, to fill the region between successive shells (step 215). From here, the process can assign reservoir properties such as, but not limited to, porosity and permeability, to each of the two-dimensional cells for modeling the fluid flow of the reservoir (step 216). These property values may be manually entered by a user or may be automatically extracted from well logs or from databases containing the pertinent geological information.

Finally, the process can input the three-dimensional cellular model into a simulation program, such as, but not limited to, Nexus® reservoir simulation software, for performing numerical simulation and for assessing the fluid flow (step 218), with process 200 terminating thereafter.

Figure 4:
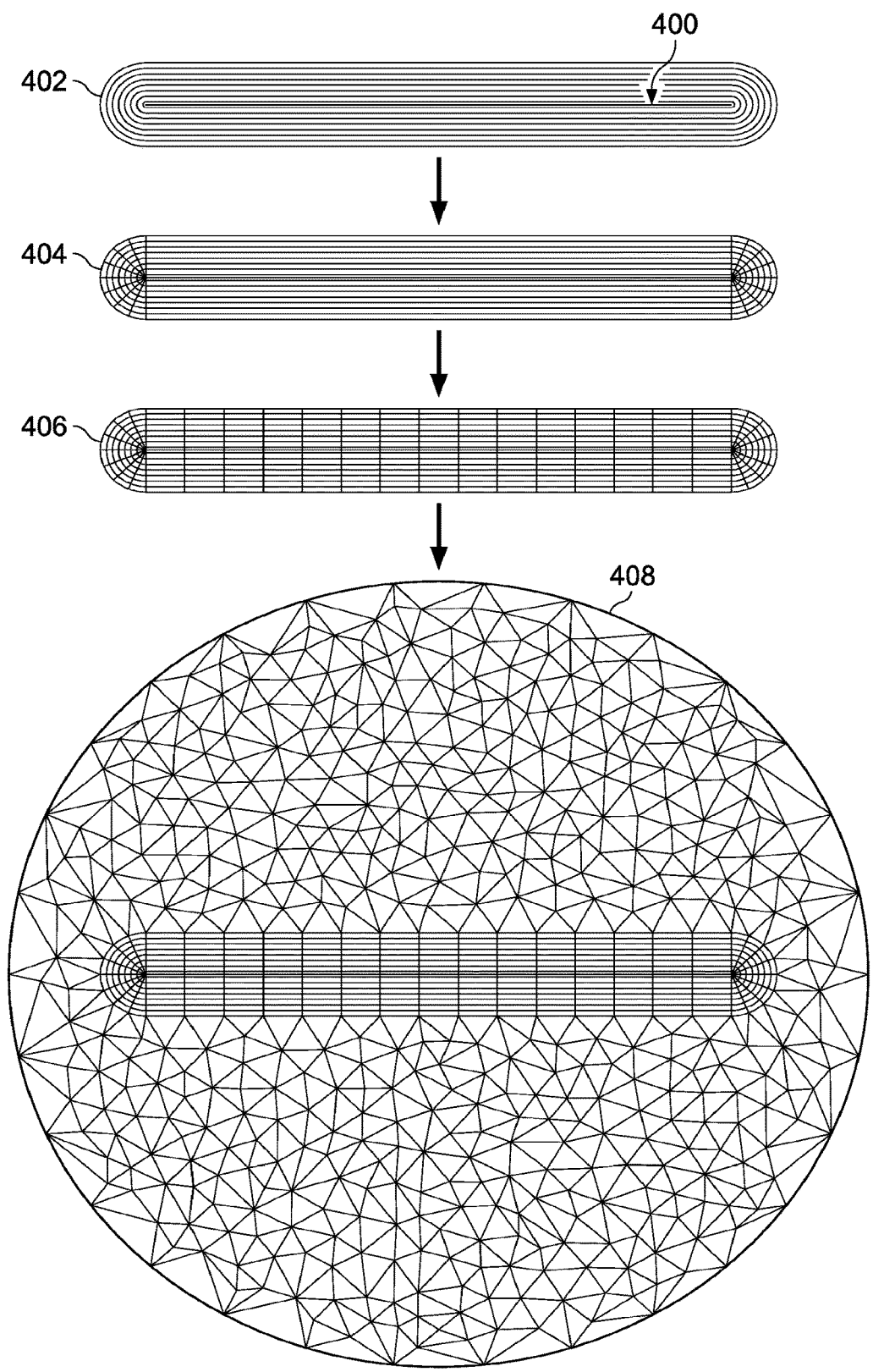
FIG. 4 illustrates an example for generating a computational mesh around a fracture line segment in accordance with the disclosed embodiments.

FIG. 4 provides an illustrative view of generating a computational mesh around a single fracture line segment in accordance with the disclosed embodiments. Beginning with diagram 402, a set of stadia is generated around a line segment 400. As can be seen by diagram 402, each stadium in the set of stadia consists of two linear sides connected by two arcs to completely enclose the straight line segment. The distance from each side to the straight line segment is a constant radius. In certain embodiments, the radius distance may be a user modifiable variable value.

In diagram 404, parametrical segments along a length and radius of each straight line segment is generated in accordance with step 210A of the process 200. Quadrilateral elements are then form where possible within the structured region as referenced in step 210B of the process 200.

Diagram 408 illustrates the constrained mesh generated around the closed loops of the line segment 400.

Figure 5:
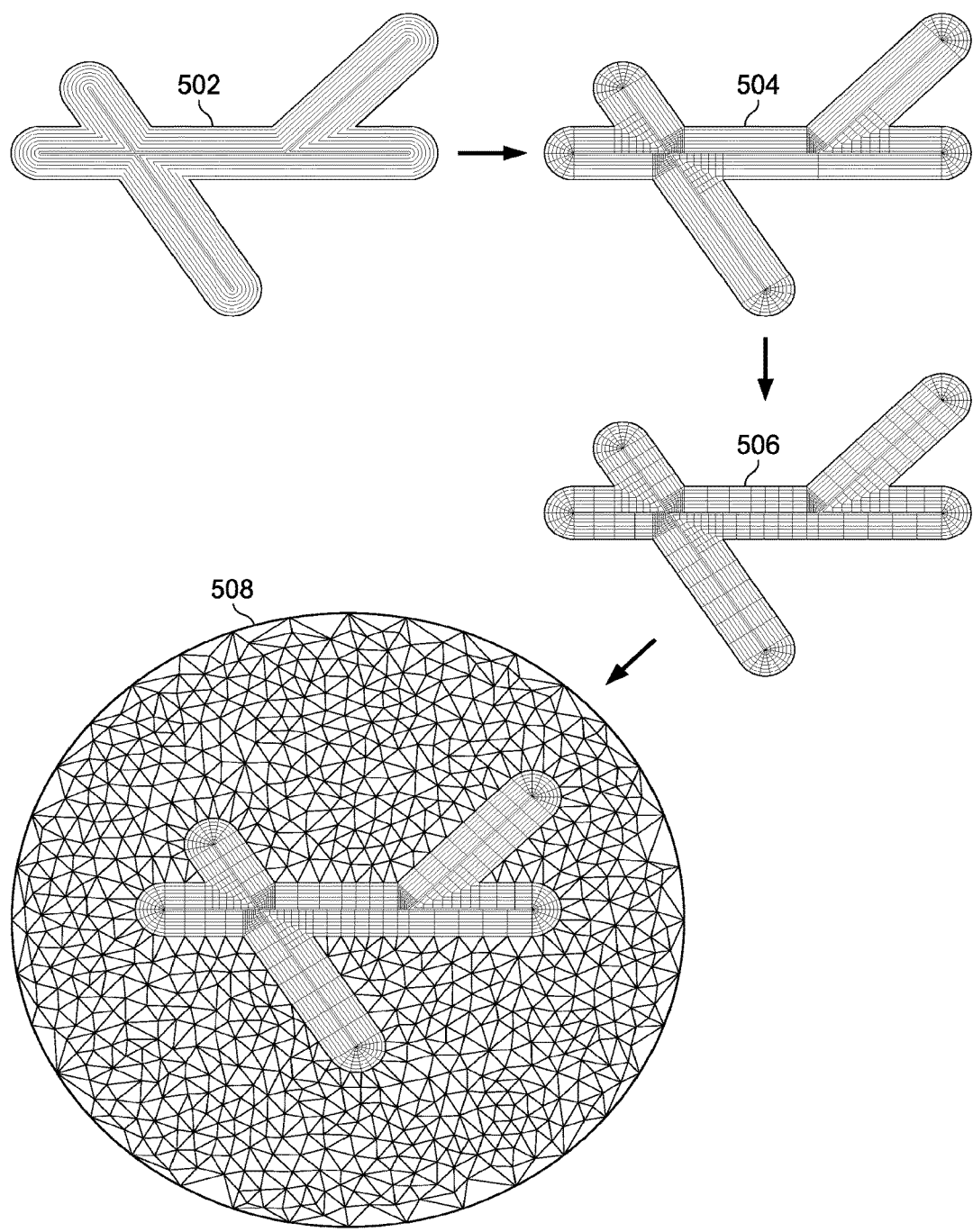
FIG. 5 illustrates an example of generating computational meshes around intersecting fracture line segments in accordance with the disclosed embodiments.

FIG. 5 provides another illustrative view of generating computational meshes around intersecting fracture line segments in accordance with the disclosed embodiments. For instance, diagram 502 illustrates a set of stadia generated around three intersecting fracture line segments. The result of diagram 502 required that the process compute an intersection of all stadia sides for each specified radius for each of the intersecting fracture line segment as referenced in step 208A and discard the contained segments for each fracture line segment that are wholly contained by stadia of other fracture line segments as referenced in step 208B.

Diagram 504 illustrates the results of generating shape elements within the closed loops of the fracture line segments as referenced in step 210. As can be seen, parametrical segments along a length and radius of each fracture line segment is generated in accordance with step 210A. In diagram 506, quadrilateral elements are formed where possible within the structured region as referenced in step 210B. In addition, polygons are formed within the remaining regions of the closed loops of the fracture line segments as stated in step 210C. Diagram 508 illustrates a constrained mesh generated around the closed loops of the intersecting fracture line segments as referenced in step 212 of process 200.

Figure 6:
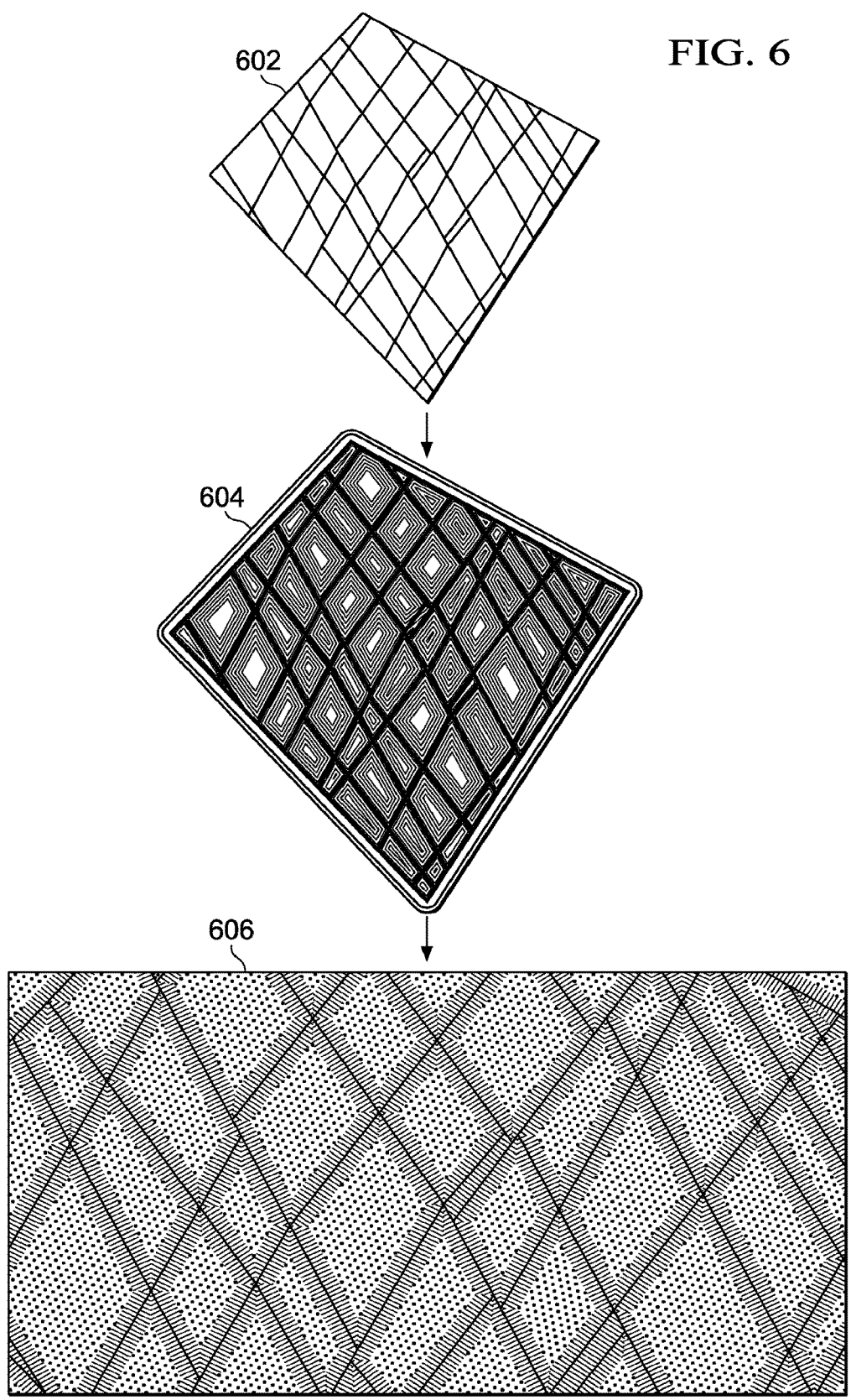
FIG. 6 illustrates an example of computational meshes around a complex array of fracture line segments in accordance with the disclosed embodiments.

As another example, FIG. 6 illustrates generating an unstructured grid around a complex array of fracture line segments in accordance with the disclosed embodiments. Diagram 602 indicates a set of fractures with geometry that has been discretized in a two-dimensional surface by a collection of line segments. Diagram 604 illustrates the results of a set of stadia being generated around each of the fracture line segments. Diagram 606 illustrates an exploded view of the fracture line segments as a result of performing the remaining process described in FIG. 2.

As can be seen from FIG. 6, the disclosed algorithm can quickly generate unstructured grids using structured elements around complex geometries. As previously stated, the two-dimension cells of a fracture may be assigned a volume attribute value for logically enabling two-dimensional cells of a fracture on adjacent two-dimensional surface to communicate.

Figure 7:
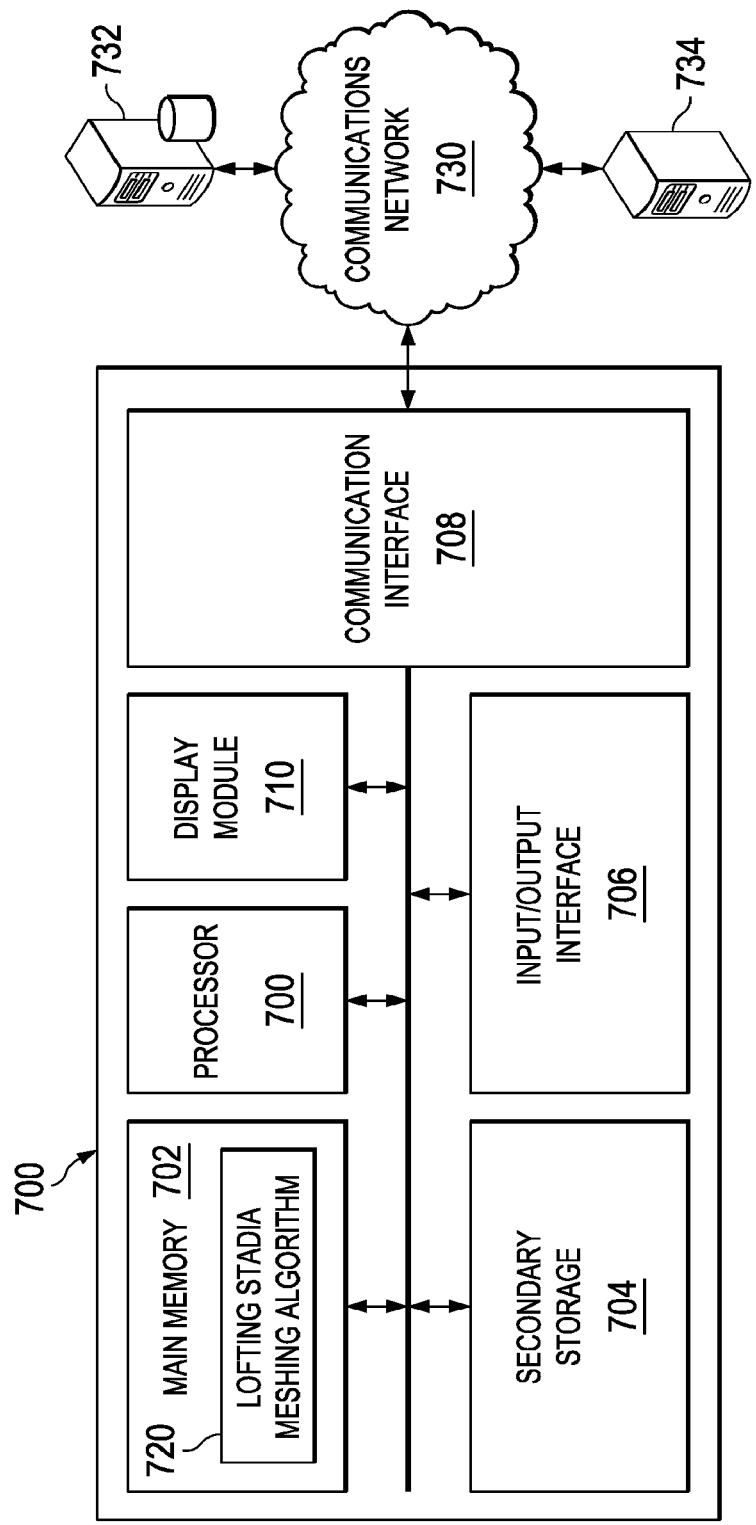
FIG. 7 is a block diagram illustrating one embodiment of a system for implementing the disclosed embodiments.

FIG. 7 is a block diagram illustrating one embodiment of a system 700 for implementing the features and functions of the disclosed embodiments. The system 700 includes, among other components, a processor 700, main memory 702, secondary storage unit 704, an input/output interface module 706, and a communication interface module 708. The processor 700 may be any type or any number of single core or multi-core processors capable of executing instructions for performing the features and functions of the disclosed embodiments.

The input/output interface module 706 enables the system 700 to receive user input (e.g., from a keyboard and mouse) and output information to one or more devices such as, but not limited to, printers, external data storage devices, and audio speakers. The system 700 may optionally include a separate display module 710 to enable information to be displayed on an integrated or external display device. For instance, the display module 710 may include instructions or hardware (e.g., a graphics card or chip) for providing enhanced graphics, touchscreen, and/or multi-touch functionalities associated with one or more display devices.

Main memory 702 is volatile memory that stores currently executing instructions/data, or instructions/data that are prefetched for execution. The secondary storage unit 704 is non-volatile memory for storing persistent data. The secondary storage unit 704 may be or include any type of data storage component such as a hard drive, a flash drive, or a memory card. In one embodiment, the secondary storage unit 704 stores the computer executable code/instructions and other relevant data for enabling a user to perform the features and functions of the disclosed embodiments.

For example, in accordance with the disclosed embodiments, the secondary storage unit 704 may permanently store the executable code/instructions of the above-described stadia meshing algorithm 720 for modeling three-dimensional (3D) objects such as, but not limited to, geological fractures. The instructions associated with the stadia meshing algorithm 720 are then loaded from the secondary storage unit 704 to main memory 702 during execution by the processor 700 as illustrated in FIG. 7.

The communication interface module 708 enables the system 700 to communicate with the communications network 730. For example, the network interface module 708 may include a network interface card and/or a wireless transceiver for enabling the system 700 to send and receive data through the communications network 730 and/or directly with other devices.

The communications network 730 may be any type of network including a combination of one or more of the following networks: a wide area network, a local area network, one or more private networks, the Internet, a telephone network such as the public switched telephone network (PSTN), one or more cellular networks, and wireless data networks. The communications network 730 may include a plurality of network nodes (not depicted) such as routers, network access points/gateways, switches, DNS servers, proxy servers, and other network nodes for assisting in routing of data/communications between devices.

For example, in one embodiment, the system 700 may interact with one or more servers 734 or databases 732 for performing the features of the present invention. For instance, the system 700 may query the database 732 for geological information for assigning reservoir properties to cells for performing a simulation. The system 700 may query the database 732 for well log information for determining fracture orientation or density for enabling modeling of the fractures in accordance with the disclosed embodiments. Further, in certain embodiments, the system 700 may act as a server system for one or more client devices or a peer system for peer to peer communications or parallel processing with one or more devices.

Figure 8:
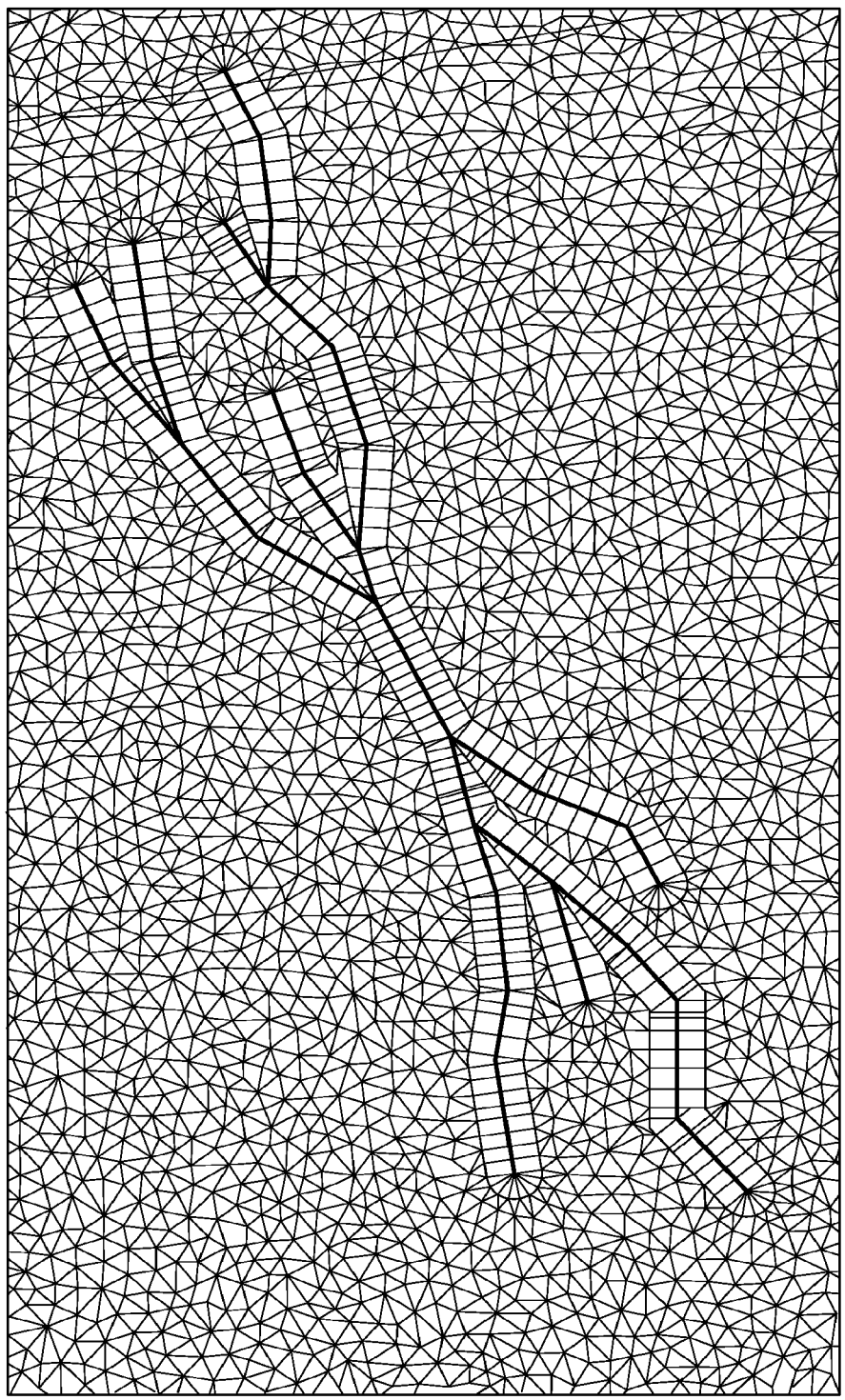
FIG. 8 illustrates another example of an unstructured grid generated around complex geometries comprising of a plurality of intersecting fracture line segments in accordance with the disclosed embodiments.

Accordingly, as described above, advantages of the disclosed embodiments include, but are not limited to, providing fast generation of unstructured grids with structured elements around complex geometries. In addition, low expertise is required on the part of the user to be able to utilize the disclosed embodiments to generate high quality grid cells that are suitable for many numeric simulators. For instance, the disclosed embodiments enable workflows for non-experts to use advanced numeric modeling techniques for complicated geometries that would have previously required users to make gross approximations and/or require per-use assistance from numeric modeling experts. As another example, FIG. 8 illustrates another example of complex geometries involving a plurality of intersecting fracture line segments in which the disclosed embodiments may quickly generate a two-dimensional grid cell that may be extruded into three-dimensional elements for performing numeric simulations in accordance with the disclosed embodiments.

While specific details about the above embodiments have been described, the above hardware and software descriptions are intended merely as example embodiments and are not intended to limit the structure or implementation of the disclosed embodiments. For instance, although many other internal components of the system 700 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosed embodiments include a method, apparatus, and computer program product for generating hybrid computational meshes around complex and discrete fractures for the purpose of reservoir simulation. For example, one disclosed embodiment is a computer-implemented method for modeling three-dimensional (3D) geological fractures. The method includes the steps of receiving a set of 3D fracture surfaces with geometry that has been discretized in a two-dimensional (2D) manifold by a collection of polygons. The method defines a family of non-intersecting 2D slicing surfaces for slicing the set of 3D fracture surfaces. The method then uses the intersection of the 2D slicing surface with the 2D manifolds defining the fracture surfaces to create a set of 2D fractures on each slicing surface. The method generates closed loops around all the line segments associated with each fracture on each slicing surface using a set of stadia and further generates shape elements within the closed loops. A constrained mesh around the closed loops of the set of fracture is generated to fill in a remainder space of on each slicing surface. The method then connects the set of stadia corresponding to each fracture from each slicing surface to its above/below neighbors using a lofting algorithm. Reservoir properties or attributes can then be assigned to each of the 3D cells for performing reservoir simulations.

In another embodiment, the method further includes substituting one or more segments of fracture line segment using one or more straight line segments to approximate a curvature of the fracture line segment. Generating the closed loops around all of the straight line segments of the fracture line segment may include, for each straight line segment in each fracture line segment, computing an intersection of all stadia sides for each specified radius, identifying contained segments for each straight line segment in each fracture line segment that are wholly contained by stadia of other line segments in the fracture line segment, and discarding the contained segments for each line segment in the fracture line segment resulting in closed loops around line segments in the fracture line segment. Generating the various shape cells within the closed loops of the straight line segment may include generating parametrical segments along a length and radius of the straight line segment within the closed loops of the straight line segment, generating quadrilateral elements where possible within the closed loops of the straight line segment, and generating polygons in remaining regions within the closed loops of the straight line segment. In another embodiment, generating the constrained cell mesh around the closed loops of the set of fracture line segments to fill in the remainder space of the 2D slicing surface may be implemented using a Delaunay triangulation algorithm. In still another embodiment, the fracture line segment may include at least two intersecting line segments corresponding to at least two intersecting fractures. In yet another embodiment, the computer-implemented method may further comprise inputting the 3D model into a numeric simulation program, and the numeric simulation program may be Nexus® Reservoir Simulation Software. In another embodiment, the shape cell elements may be polyhedrons. Connecting points on the first stadia to the corresponding point on the second stadia in the neighboring 2D slicing surface to form the 3D shells may use a lofting technique algorithm. In another embodiment, connecting points on the first stadia to the corresponding point on the second stadia in the neighboring 2D slicing surface to form 3D shells may comprise determining whether the second stadia in the neighboring 2D slicing surface is part of a same fracture as the first stadia.

In another embodiment, a non-transitory computer readable medium comprising computer executable instructions for modeling a three-dimensional (3D) structure is provided. The computer executable instructions when executed cause one or more machines to perform operations including receiving a 3D domain that includes a set of 3D fracture surfaces with geometry that has been discretized in a 2D manifold by a collection of polygons. The 3D domain is intersected with a set of non-intersecting 2D slicing surfaces to generate a set of 2D fracture line segments on each 2D slicing surface at the intersection of a respective slicing surface and the 2D manifolds defining the 3D fracture surfaces. For each 2D slicing surface, and for each straight line segment in each fracture line segment of the set of fracture line segments, a set of stadia is generated at a specified radii from a straight line segment, closed loops are generated around all the straight line segments of the fracture line segment, and various shape cells are generated within the closed loops of the straight line segment. For each 2D slicing surface, a constrained cell mesh is generated around the closed loops of the set of fracture line segments to fill in a remainder space of the 2D slicing surface. For each 2D slicing surface, and for each stadia of each fracture line segment, points are connected on a first stadia to a corresponding point on a second stadia in a neighboring 2D slicing surface to form 3D shells. For each 2D slicing surface, shape cell elements are generated in between successive 3D shells to fill a region between the successive 3D shells, and reservoir properties are assigned to each cell to produce a 3D model.

In another embodiment, the computer readable medium further includes computer executable instructions for substituting one or more segments of fracture line segment using one or more straight line segments to approximate a curvature of the fracture line segment. The computer executable instructions for generating the closed loops around all of the straight line segments of the fracture line segment may comprise, for each straight line segment in each fracture line segment, computing an intersection of all stadia sides for each specified radius, identifying contained segments for each straight line segment in each fracture line segment that are wholly contained by stadia of other line segments in the fracture line segment, and discarding the contained segments for each line segment in the fracture line segment resulting in closed loops around line segments in the fracture line segment. In another embodiment, the computer executable instructions for generating the various shape cells within the closed loops of the straight line segment may comprise instructions for generating parametrical segments along a length and radius of the straight line segment within the closed loops of the straight line segment, generating quadrilateral elements where possible within the closed loops of the straight line segment, and generating polygons in remaining regions within the closed loops of the straight line segment. The computer executable instructions for connecting points on the first stadia to the corresponding point on the second stadia in the neighboring 2D slicing surface to form the 3D shells may use a lofting technique algorithm. The computer executable instructions for connecting points on the first stadia to the corresponding point on the second stadia in the neighboring 2D slicing surface to form 3D shells may comprise instructions for determining whether the second stadia in the neighboring 2D slicing surface is part of a same fracture as the first stadia.

In yet another embodiment, a system includes at least one processor and at least one memory coupled to the at least one processor and storing computer executable instructions. The computer executable instructions when executed by the at least one processor perform operations comprising receiving a 3D domain that includes a set of 3D fracture surfaces with geometry that has been discretized in a 2D manifold by a collection of polygons. The 3D domain is intersected with a set of non-intersecting 2D slicing surfaces to generate a set of 2D fracture line segments on each 2D slicing surface at the intersection of a respective slicing surface and the 2D manifolds defining the 3D fracture surfaces. For each 2D slicing surface, and for each straight line segment in each fracture line segment of the set of fracture line segments, a set of stadia is generated at a specified radii from a straight line segment, closed loops are generated around all the straight line segments of the fracture line segment, and various shape cells are generated within the closed loops of the straight line segment. For each 2D slicing surface, a constrained cell mesh is generated around the closed loops of the set of fracture line segments to fill in a remainder space of the 2D slicing surface, and for each stadia of each fracture line segment, points are connected on a first stadia to a corresponding point on a second stadia in a neighboring 2D slicing surface to form 3D shells. For each 2D slicing surface, shape cell elements are generated in between successive 3D shells to fill a region between the successive 3D shells and reservoir properties are assigned to each cell to produce a 3D model.

In another embodiment, the computer executable instructions for generating the various shape cells within the closed loops of the straight line segment include instructions for generating parametrical segments along a length and radius of the straight line segment within the closed loops of the straight line segment, generating quadrilateral elements where possible within the closed loops of the straight line segment, and generating polygons in remaining regions within the closed loops of the straight line segment. The computer executable instructions for connecting points on the first stadia to the corresponding point on the second stadia in the neighboring 2D slicing surface to form 3D shells may comprise instructions for determining whether the second stadia in the neighboring 2D slicing surface is part of a same fracture as the first stadia.

One advantage of the disclosed embodiments is that it enables fast generation of unstructured grids with structured elements around complex geometries.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for modeling three-dimensional (3D) geological fractures for reservoir simulation, the method comprising:

receiving, by a processor, a set of fracture line segments representing a set of 3D fracture surfaces with geometry that has been discretized on each 2D slicing surface in a set of non-intersecting 2D slicing surfaces that intersect the set of 3D fracture surfaces within a 3D domain;

generating, by the processor, a structured region for each fracture line segment on each 2D slicing surface in the set of non-intersecting 2D slicing surfaces, the generating by:
  generating a set of stadia at specified radii from the fracture line segment to form closed loops around the fracture line segment; and
  generating various shape cells within the closed loops of the set of stadia generated for the fracture line segment;
generating, by the processor, a constrained cell mesh around the structured region generated for each fracture line segment in the set of fracture line segments to fill in a remainder space of each 2D slicing surface;
extruding, by the processor, the various shape cells from the set of stadia of the structured region for each fracture line segment on at least one 2D slicing surface into the 3D domain to form 3D shells connecting the set of stadia of the at least one 2D slicing surface to corresponding stadia on a neighboring 2D slicing surface in the set of non-intersecting 2D slicing surfaces;
assigning, by the processor, reservoir properties to each of the extruded shape cells to produce a 3D model of a reservoir formation; and
simulating, by the processor, fluid flow within the reservoir formation, based on the 3D model, wherein the simulated fluid flow is used to estimate petroleum reserves.

2. The computer-implemented method of claim 1, further comprising:
  substituting one or more segments of each fracture line segment on at least one of the 2D slicing surfaces with one or more straight line segments to approximate a curvature of the fracture line segment.

3. The computer-implemented method of claim 1, wherein generating the set of stadia of the structured region for each fracture line segment further comprises:
  computing an intersection of all stadia sides for each specified radius;
  identifying at least one straight line segment in each fracture line segment that is wholly contained by stadia of other straight line segments in the fracture line segment; and
  discarding the identified straight line segment in the fracture line segment to form the closed loops around the fracture line segment.

4. The computer-implemented method of claim 1, wherein generating the various shape cells within the closed loops of the set of stadia for the fracture line segment comprises:
  generating parametrical segments along a length and radius of the closed loops,
  generating quadrilateral elements within the closed loops; and
  generating polygons in remaining regions within the closed loops.

5. The computer-implemented method of claim 1, wherein the constrained cell mesh around the structured region generated for each fracture line segment is generated using a Delaunay triangulation algorithm.

6. The computer-implemented method of claim 1, wherein the fracture line segment comprises at least two intersecting line segments corresponding to at least two intersecting fractures.

7. The computer-implemented method of claim 1, wherein the reservoir simulator is a numeric simulation program executable by the processor, and providing the 3D model to the reservoir simulator comprises inputting the 3D model into the numeric simulation program.

8. The computer-implemented method of claim 7, wherein the numeric simulation program is a reservoir simulation program for simulating fluid flow within the reservoir formation.

9. The computer-implemented method of claim 1, further comprising:
  generating shape cell elements to fill regions of the 3D domain between successive 3D shells, wherein the shape cell elements include polyhedron-shaped cells.

10. The computer-implemented method of claim 1, wherein the extruding further comprises connecting, by the processor using a lofting algorithm, points on the set of stadia for each fracture line segment on the at least one 2D slicing surface to points on the corresponding stadia on the neighboring 2D slicing surface to form the 3D shells.

11. The computer-implemented method of claim 10, wherein the connecting is performed based on determining that the set of stadia for each fracture line segment on the at least one 2D slicing surface and the corresponding stadia on the neighboring 2D slicing surface are associated with a same 3D fracture surface.

12. A non-transitory computer readable medium comprising computer executable instructions for modeling a three-dimensional (3D) structure for reservoir simulation, the computer executable instructions when executed causes one or more machines to perform operations comprising:
  receiving a set of fracture line segments representing a set of 3D fracture surfaces with geometry that has been discretized on each 2D slicing surface in a set of non-intersecting 2D slicing surfaces that intersect the set of 3D fracture surfaces within a 3D domain;
  generating a structured region for each fracture line segment on each 2D slicing surface in the set of non-intersecting 2D slicing surfaces, the generating by:
    generating a set of stadia at specified radii from the fracture line segment to form closed loops around the fracture line segment; and
    generating various shape cells within the closed loops of the set of stadia generated for the fracture line segment;
  generating a constrained cell mesh around the structured region generated for each fracture line segment in the set of fracture line segments to fill in a remainder space of each 2D slicing surface;
  extruding the various shape cells from the set of stadia of the structured region for each fracture line segment on at least one 2D slicing surface into the 3D domain to form 3D shells connecting the set of stadia of the at least one 2D slicing surface to corresponding stadia on a neighboring 2D slicing surface in the set of non-intersecting 2D slicing surfaces;
  assigning reservoir properties to each of the extruded shape cells to produce a 3D model of a reservoir formation; and
  simulating fluid flow within the reservoir formation, based on the 3D model, wherein the simulated fluid flow is used to estimate petroleum reserves.

13. The computer readable medium of claim 12, further comprising computer executable instructions for substituting one or more segments of each fracture line segment on at least one of the 2D slicing surfaces with one or more straight line segments to approximate a curvature of the fracture line segment.

14. The computer readable medium of claim 12, wherein the computer executable instructions for generating the set of stadia of the structured region for each fracture line segment further comprises:
- computing an intersection of all stadia sides for each specified radius;
- identifying at least one straight line segment in each fracture line segment that is wholly contained by stadia of other straight line segments in the fracture line segment; and
- discarding the identified straight line segment in the fracture line segment to form the closed loops around the fracture line segment.

15. The computer readable medium of claim 12, wherein the computer executable instructions for generating the various shape cells within the closed loops of the set of stadia for the fracture line segment comprises instructions for:
- generating parametrical segments along a length and radius of the closed loops;
- generating quadrilateral elements within the closed loops; and
- generating polygons in remaining regions within the closed loops.

16. The computer readable medium of claim 12, wherein the computer executable instructions for extruding the various shape cells further comprises instructions for using a lofting technique algorithm to connect points on the set of stadia to points on the corresponding stadia on the neighboring 2D slicing surface to form the 3D shells.

17. The computer readable medium of claim 12, wherein the computer executable instructions further comprises instructions for determining whether the set of stadia for each fracture line segment on the at least one 2D slicing surface and the corresponding stadia on the neighboring 2D slicing surface are associated with a same 3D fracture surface.

18. A system, comprising:
- at least one processor; and
- at least one memory coupled to the at least one processor and storing computer executable instructions that when executed by the at least one processor causes the at least one processor to perform operations comprising:
  - receiving a set of fracture line segments representing a set of 3D fracture surfaces with geometry that has been discretized on each 2D slicing surface in a set of non-intersecting 2D slicing surfaces that intersect the set of 3D fracture surfaces within a 3D domain;
  - generating a structured region for each fracture line segment on each 2D slicing surface in the set of non-intersecting 2D slicing surfaces, the generating by:
    - generating a set of stadia at specified radii from the fracture line segment to form closed loops around the fracture line segment; and
    - generating various shape cells within the closed loops of the set of stadia generated for the fracture line segment;
  - generating a constrained cell mesh around the structured region generated for each fracture line segment in the set of fracture line segments to fill in a remainder space of each 2D slicing surface;
  - extruding the various shape cells from the set of stadia of the structured region for each fracture line segment on at least one 2D slicing surface into the 3D domain to form 3D shells connecting the set of stadia of the at least one 2D slicing surface to corresponding stadia on a neighboring 2D slicing surface in the set of non-intersecting 2D slicing surfaces;
  - assigning reservoir properties to each of the extruded shape cells to produce a 3D model of a reservoir formation; and
  - simulating fluid flow within the reservoir formation, based on the 3D model, wherein the simulated fluid flow is used to estimate petroleum reserves.

19. The system of claim 18, wherein the computer executable instructions for generating the various shape cells within the closed loops of the set of stadia for the fracture line segment comprises instructions for:
- generating parametrical segments along a length and radius of the closed loops;
- generating quadrilateral elements within the closed loops; and
- generating polygons in remaining regions within the closed loops.

20. The system of claim 18, wherein the computer executable instructions further comprises instructions for determining whether the set of stadia for each fracture line segment on the at least one 2D slicing surface and the corresponding stadia on the neighboring 2D slicing surface are associated with a same 3D fracture surface.

* * * * *